June 13, 1950 M. McGRAW 2,511,536
ELECTRIC IRON
Filed July 29, 1947
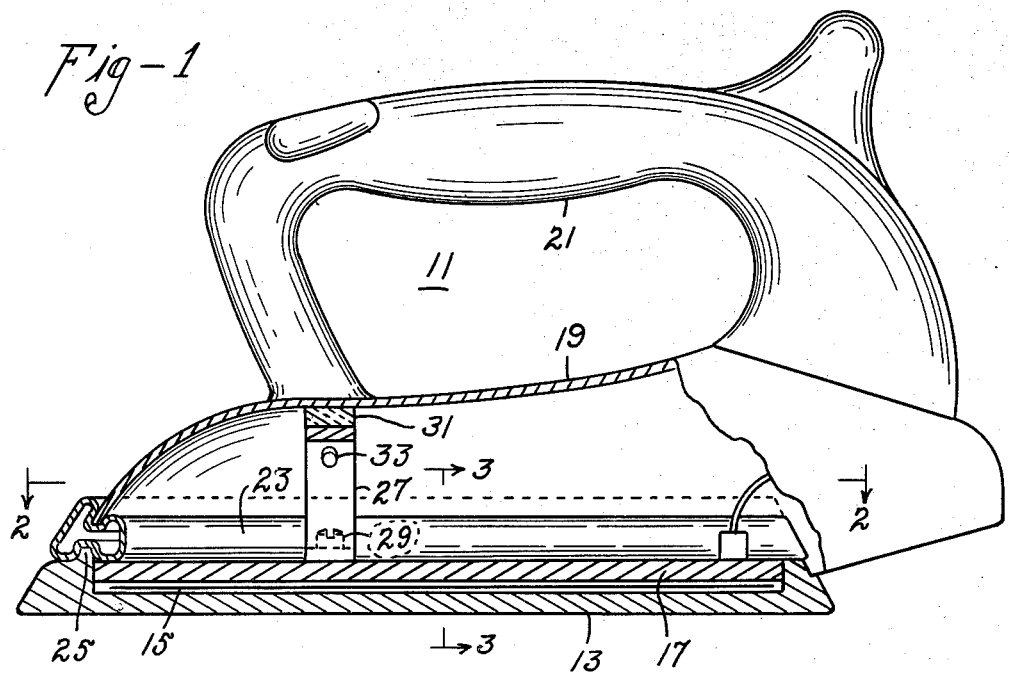
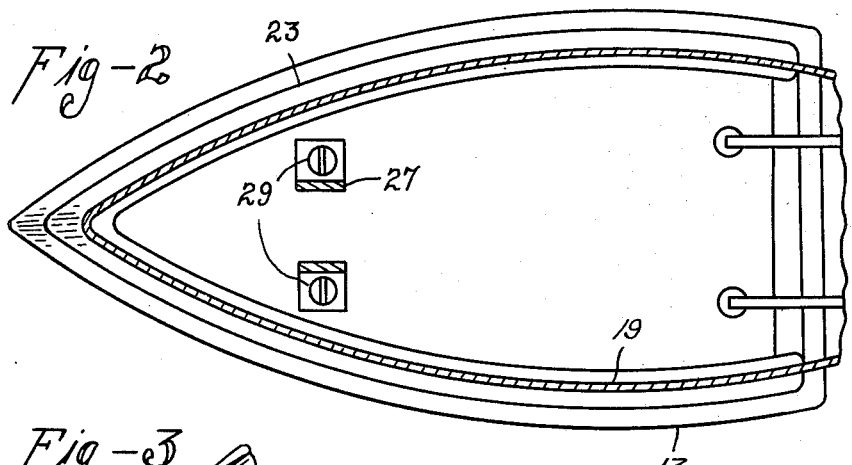
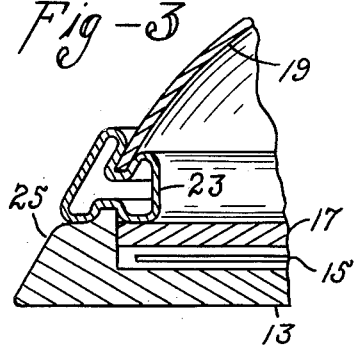
INVENTOR.
MAX McGRAW
BY
ATTY.

Patented June 13, 1950

2,511,536

UNITED STATES PATENT OFFICE 2,511,536

ELECTRIC IRON

Max McGraw, Chicago, Ill., assignor to McGraw Electric Company, Elgin, Ill., a corporation of Delaware Application July 29, 1947, Serial No. 764,484

2 Claims. (Cl. 38—89)

My invention relates to electric irons and particularly to means for limiting the temperature rise of the cover.

An object of my invention is to provide means in an electrically heated iron to reduce the flow of heat from the heated body to the casing or cover.

Another object of my invention is to provide relatively simple means for preventing excessive flow of heat from the heated body to the cover or casing.

Other objects of my invention will either be apparent from a description of one form of device embodying my invention or will be pointed out in the course of such description and be set forth particularly in the appended claims.

In the drawings,

Figure 1 is a view, partly in side elevation and partly in longitudinal section, of an electric iron embodying my invention, Fig. 2 is a view in horizontal section therethrough taken on the line 2—2 of Fig. 1, and, Fig. 3 is a fragmentary vertical sectional view, on an enlarged scale, taken on the line 3—3 of Fig. 1.

An electric iron, designated in its entirety by the numeral 11, comprises a soleplate 13 having an upper recess in which is positioned an electric heating element 15, this heating element being clamped in close engagement with the soleplate 13 by an upper or clamping plate 17. While I have not shown any means for holding the upper plate 17 in proper operative position, any desired means for holding the plate 17 in close engagement with the upper face of the electric heater 15 may be utilized.

I provide also a casing or cover 19 and a handle structure 21 which is secured against the upper surface of casing 19.

I provide a tubular member 23 which consists of a tube preferably made of stainless steel and deformed to receive on its upper indented surface the lower edge of casing 19 and to receive in its lower indentation a relatively narrow upstanding flange 25 constituting a part of the soleplate 13.

While I preferably use stainless steel I do not desire to be limited thereto but may use any material having a high resistance to the flow of heat.

I have shown means for supporting the casing 19 by the top plate 17, this means comprising a front stirrup 27 of substantially inverted U shape which may be secured to the top plate 17 as by a pair of short machine screws 29.

The securing of the casing 19 to the stirrup 29 may be through a heat-insulating member 31, the casing 19 being secured against the stirrup 29 by a pair of screws 33.

Substantially the same means may be employed for supporting the rear end of casing 19.

The use of an indented tube provides a means for holding the casing in fixed position on the heated body and for presenting a pleasing appearance. The thickness of the wall of the tube may be made relatively small thereby interposing a relatively high thermal reluctance into the path of flow of the heat.

Various modifications may be made in the device embodying my invention without departing from the spirit and scope thereof and such modifications clearly coming within the scope of the appended claims and all structures covered by the appended claims are to be considered a part of my invention.

I claim as my invention:

1. In a sad iron, the combination with a sole plate, means for applying heat thereto, and a casing thereabove having a depending skirt, of means for reducing the flow of heat from the sole plate to the casing comprising a tubular member of a material having high resistance to the flow of heat lying between said sole plate and the lower edge of the skirt of said casing, said tubular member having a longitudinally-extending groove for fitting and receiving said lower edge of the skirt of said casing, said tubular member also lying in engagement with said sole plate.

2. The combination of claim 1 wherein said sole plate has an upwardly extending flange adjacent its outer edge, and wherein a second longitudinally extending groove in said tubular member fits and receives said flange.

MAX McGRAW.

REFERENCES CITED

The following references are of record in the file of this patent:

UNITED STATES PATENTS

| Number | Name | Date |
|---|---|---|
| 1,686,809 | Grau | Oct. 9, 1928 |
| 2,030,596 | Johnson | Feb. 11, 1936 |
| 2,034,042 | Lang | Mar. 17, 1936 |
| 2,257,451 | Barnes | Sept. 30, 1941 |